United States Patent
Abuelsaad et al.

(10) Patent No.: US 9,321,447 B2
(45) Date of Patent: Apr. 26, 2016

(54) VEHICLE POWERTRAIN SYNCHRONIZATION BASED ON PREDICTED DRIVER ACTIONS

(71) Applicant: International Business Machines Corporation, Armonk, NY (US)

(72) Inventors: Tamer E. Abuelsaad, Somers, NY (US); Gregory J. Boss, Saginaw, MI (US); Brent Hodges, Raleigh, NC (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/280,287

(22) Filed: May 16, 2014

(65) Prior Publication Data

US 2015/0329098 A1 Nov. 19, 2015

(51) Int. Cl.
*B60W 10/06* (2006.01)
*B60W 10/10* (2012.01)
(Continued)

(52) U.S. Cl.
CPC .............. *B60W 10/06* (2013.01); *B60W 10/10* (2013.01); *B60W 2510/00* (2013.01); *B60W 2510/104* (2013.01); *B60W 2550/10* (2013.01); *B60W 2550/14* (2013.01); *B60W 2550/143* (2013.01); *B60W 2710/0616* (2013.01); *B60W 2710/10* (2013.01); *F16H 59/36* (2013.01); *F16H 59/40* (2013.01); *F16H 59/42* (2013.01); *F16H 59/60* (2013.01); *F16H 2059/366* (2013.01); *Y10T 477/65* (2015.01); *Y10T 477/675* (2015.01); *Y10T 477/677* (2015.01); *Y10T 477/679* (2015.01)

(58) Field of Classification Search
CPC ... F16H 59/36; F16H 2059/366; F16H 59/40; F16H 59/42; F16H 59/60; Y10T 477/65; Y10T 477/675; Y10T 477/677; Y10T 477/679; B60W 10/06; B60W 10/10; B60W 2510/104; B60W 2510/0638; B60W 2510/1015; B60W 2550/14; B60W 2550/1473; B60W 2550/10
USPC .......................... 180/171; 701/54, 58, 65, 70
See application file for complete search history.

(56) References Cited

U.S. PATENT DOCUMENTS 4,930,081 A * 5/1990 Dunkley ............... B60K 41/284
 477/78
5,911,771 A * 6/1999 Reichart ................. F16H 59/60
 477/97

(Continued)

FOREIGN PATENT DOCUMENTS

| DE | GB 2318106 A | * | 4/1998 | .............. B60T 8/175 |
| EP | 1645454 | | 2/2008 | |
| WO | 2011088344 | | 7/2011 | |

OTHER PUBLICATIONS

Anonymous, "A Method and System for Preserving Fuel of a Vehicle by Disengaging Transmission," ip.com, IPCOM000234811D, Feb. 7, 2013, 4 pages.

*Primary Examiner* — Roger Pang
(74) *Attorney, Agent, or Firm* — VanLeeuwen & VanLeeuwen; Damion C. Josephs (57) ABSTRACT

An approach is provided in which a powertrain synchronizer analyzes condition data that corresponds to impending conditions external to a vehicle. The powertrain synchronizer predicts a driver's future action in response analyzing the condition data and adjusts the vehicle's powertrain subsystem based upon the predicted driver action.

17 Claims, 5 Drawing Sheets

(51) Int. Cl.
  *F16H 59/36* (2006.01)
  *F16H 59/40* (2006.01)
  *F16H 59/42* (2006.01)
  *F16H 59/60* (2006.01)

(56) References Cited

U.S. PATENT DOCUMENTS

| | | | |
|---|---|---|---|
| 7,931,231 B2 | 4/2011 | Cherepinsky et al. | |
| 8,258,934 B2 | 9/2012 | Filev et al. | |
| 8,731,788 B2 * | 5/2014 | Sujan | B60W 50/0097 180/169 |
| 8,965,645 B2 * | 2/2015 | Ahn | F16H 61/0213 477/45 |
| 9,002,612 B2 * | 4/2015 | McNew | G06N 99/005 701/33.4 |
| 2005/0239597 A1 * | 10/2005 | Shimada | B60W 10/06 477/107 |
| 2008/0097699 A1 | 4/2008 | Ono et al. | |
| 2008/0167820 A1 | 7/2008 | Oguchi et al. | |
| 2010/0131148 A1 | 5/2010 | Camhi et al. | |
| 2012/0220424 A1 * | 8/2012 | Staudinger | B60W 30/16 477/80 |
| 2013/0052614 A1 * | 2/2013 | Mollicone | G09B 19/167 434/65 |

* cited by examiner

VEHICLE POWERTRAIN SYNCHRONIZATION BASED ON PREDICTED DRIVER ACTIONS

BACKGROUND

The present disclosure relates to predicting a driver's future actions in a vehicle and synchronizing the vehicle's powertrain based on the driver's predicted future actions.

As a driver travels on a road, the driver accelerates, decelerates, starts, and stops according to variables such as road terrain, obstacles, and traffic conditions. When the driver removes the driver's foot from an accelerator pedal to decelerate or coast, the vehicle's transmission remains engaged with the vehicle's engine crankshaft and driveshaft. As such, a coupling exists between the engine and the wheels through the transmission, which produces both a positive outcome and a negative outcome on the vehicle. From a positive standpoint, the transmission acts as a breaking mechanism for the vehicle and the vehicle eventually decelerates to within a few miles per hour (mph) of a full stop depending on the road gradient. Large semi-trucks often use this principle to reduce wear on brakes. From a negative standpoint, however, the vehicle's fuel efficiency is reduced because of friction effects and engine load.

To improve fuel efficiency, a driver may place the transmission in neutral while the driver's vehicle is coasting. However, when the driver attempts to re-engage the transmission while traveling at a significant speed, undue wear and tear is placed on the transmission because one side of the transmission is rotating at the engine speed and the other side is rotating at a higher rate proportional to the gear and speed of the vehicle's turning transfer case. Since vehicles today operate in a "reactionary" mode to driver conditions, the vehicle's powertrain is constantly reacting to a driver's accelerations, decelerations, stops, and starts. As such, the vehicle is subject to both reduced fuel efficiency and undue wear and tear.

BRIEF SUMMARY

According to one embodiment of the present disclosure, an approach is provided in which a powertrain synchronizer analyzes condition data that corresponds to impending conditions external to a vehicle. The powertrain synchronizer predicts a driver's future action in response analyzing the condition data and adjusts the vehicle's powertrain subsystem based upon the predicted driver action.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
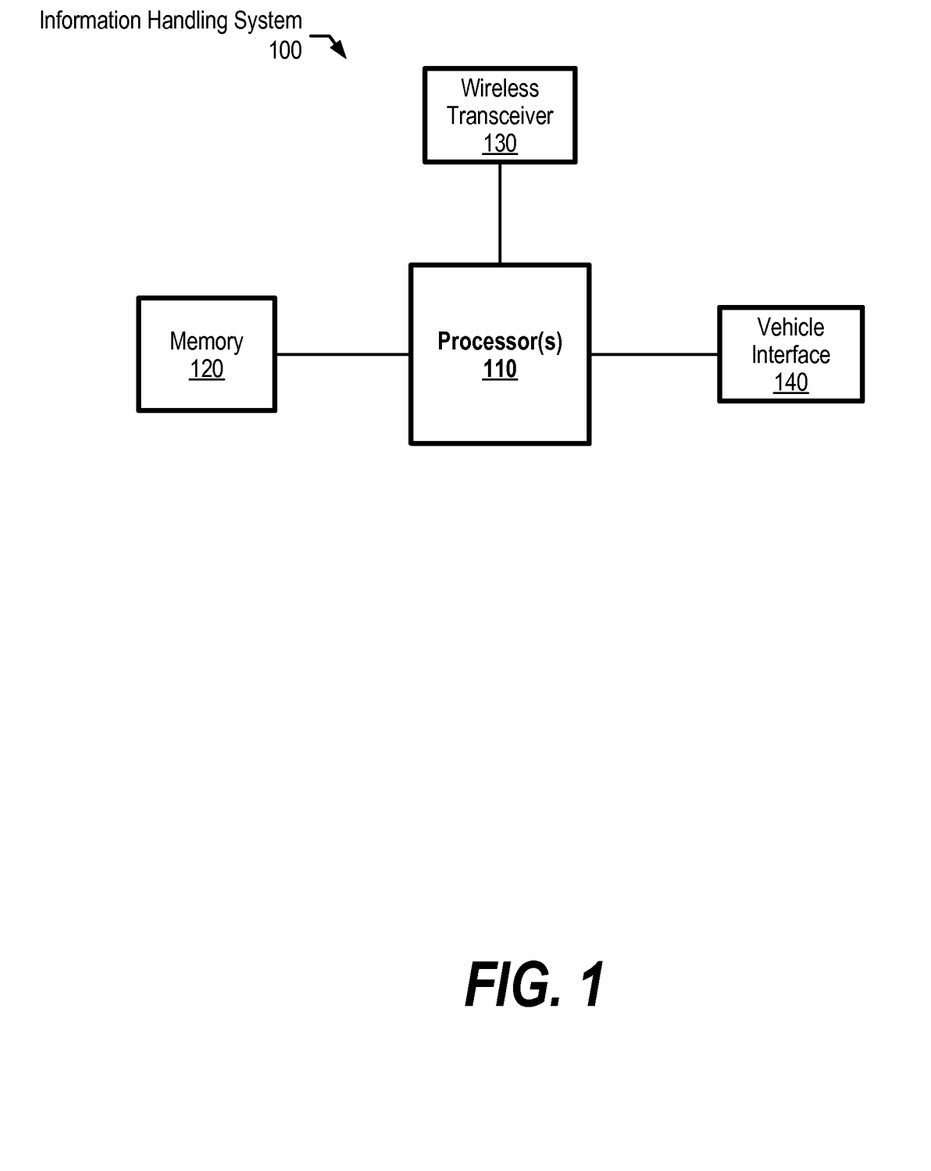
FIG. 1 depicts an information handling system, which is a simplified example of a computer system capable of performing the computing operations described herein.

FIG. 1 illustrates information handling system 100, which is a simplified example of a computer system capable of performing the computing operations described herein. Information handling system 100 includes one or more processors 110 coupled to memory 120. Memory 120 may include volatile memory, non-volatile memory, or a combination of volatile and non-volatile memory. In one embodiment, processors 110 may include microprocessors, micro-controllers, application-specific integrated circuits (ASICs), or another type of integrated circuit capable of performing the functions described herein.

Information handling system 100 also includes wireless transceiver 130, which receives wireless data from a wireless network such as a global positioning system (GPS) network, a cellular network, a traffic report network, or other wireless network that transmits vehicle-related data. Vehicle interface 140 couples to processors 110, and monitors driver control information, powertrain information, and driver indicator controls as discussed herein. In one embodiment, processors 110 may perform all or part of such functions of vehicle interface 140.

FIGS. 2-5 depict an approach that can be executed on an information handling system, such as one shown in FIG. 1. A system and method of predicting a vehicle driver's actions based on analyzing condition data, and synchronizing the vehicle's powertrain based on the predicted driver actions is presented. A powertrain synchronizer analyzes condition data that corresponds to impending conditions external to the vehicle. For example, the impending conditions may include a traffic light state change, a construction site, an accident around a curve in a road, etc. The powertrain synchronizer predicts a driver action in response to analyzing the condition data, such as depressing an accelerator pedal or depressing a brake pedal. In turn, the powertrain synchronizer synchronizes the powertrain based upon the predicted driver action by adjusting the engine's crankshaft rotation speed to match the vehicle transmission's internal rotation speed.

In one embodiment, the powertrain synchronizer predicts that the driver action will accelerate the vehicle. In this embodiment, the powertrain synchronizer analyzes a driveshaft rotation speed of the powertrain subsystem and configures the transmission gear assembly based upon the driveshaft rotation. The powertrain synchronizer analyzes the gear assembly's input shaft rotation speed and adjusts the engine's fuel rate to match the engine's crankshaft rotation speed to the gear assembly input shaft rotation speed and synchronize the powertrain. In this embodiment, the powertrain synchronizer informs the driver to increase the accelerator pedal pressure once the powertrain is synchronized. The powertrain synchronizer, in turn, engages the transmission when the driver increases the accelerator pedal pressure.

In yet another embodiment, the predicted driver action will decelerate the vehicle. In this embodiment, the powertrain synchronizer provides an indication to the driver to decrease accelerator pedal pressure. The powertrain synchronizer, in turn, disengages the vehicle's transmission included in the powertrain subsystem when the driver decreases accelerator pedal pressure.

In yet another embodiment, the vehicle receives the condition data over a wireless network. In this embodiment, the impending conditions may correspond to an upcoming road terrain change, an upcoming speed limit change, or an upcoming stop sign marker. In yet another embodiment, the condition data corresponds to a predicted impending condition such as a predicted traffic light status change or a predicted emergency vehicle arrival. For example, an emergency vehicle may be approaching the driver's location that is on route to an accident, fire, robbery, etc.

Figure 2:
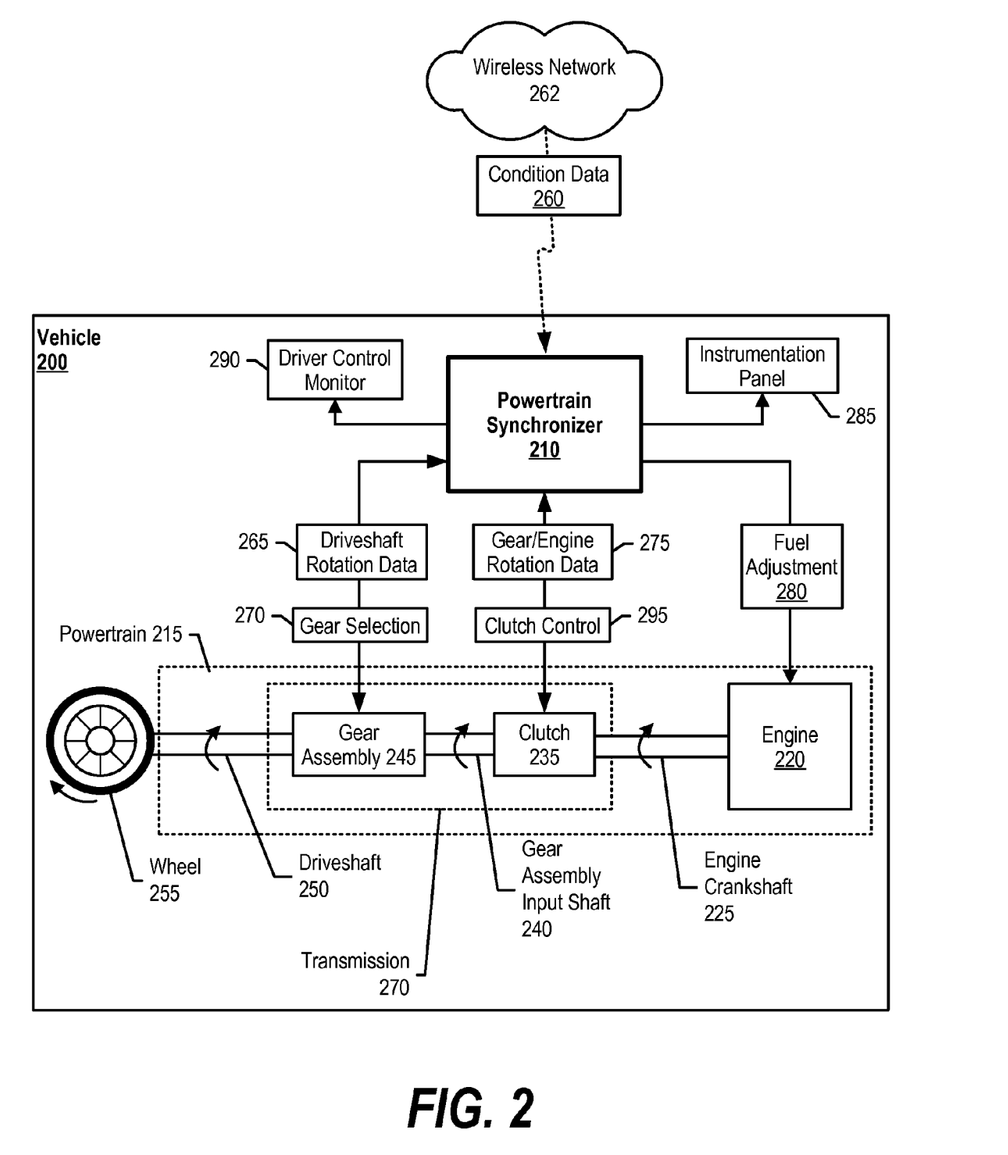
FIG. 2 depicts a diagram of a vehicle system that synchronizes a powertrain subsystem based upon a predicted a driver action determined from condition data.

FIG. 2 depicts a diagram of a vehicle system that synchronizes a powertrain subsystem based upon a predicted a driver action determined from condition data. Vehicle 200 may be an automobile, truck, motorcycle, train, or other transportation mechanism utilized for transportation purposes. Vehicle 200 may be powered by an internal combustion engine, electric engine, or other mechanism that provides propulsion to vehicle 200.

Vehicle 200 includes powertrain synchronizer 210, which may be a processor, microcontroller, or other type of computer system capable of performing the functions described herein such as information handling system 100 shown in FIG. 1. Powertrain synchronizer 210 receives condition data 260 over wireless network 262, which may be a GPS network, cellular network, traffic report network, or other network that transmits informational data to vehicle 200. In one embodiment, the condition data corresponds to impending conditions such as an upcoming speed limit change, an upcoming stop sign marker, road terrain changes such as curves or hills, etc. In another embodiment, the condition data corresponds to predicted impending conditions, which are conditions that are not yet apparent such as a predicted traffic light state change or a predicted emergency vehicle arrival.

Powertrain synchronizer 210 analyzes condition data 260 and determines that, due to impending conditions, the driver will soon perform a driver action such as increasing/decreasing pressure to an accelerator pedal or brake pedal. When the predicted driver action will result in a deceleration of vehicle 200, such as by applying the brake pedal or decreasing pressure on the accelerator pedal, powertrain synchronizer 210 informs the driver via an illumination indicator on instrumentation panel 285 to perform the predicted driver action (see FIG. 5 and corresponding text for further details). Once powertrain synchronizer 210 detects that the driver performed the predicted driver action via driver control monitor 290, powertrain synchronizer 210 disengages transmission 230 from engine 220 by disengaging clutch 235 via clutch control 295. In one embodiment, powertrain synchronizer 210 waits to disengage transmission 230 until after the driver performs the predicted driver action in order to avoid unexpected transmission disengagement to the driver. In another embodiment, the driver is able to select whether to have powertrain synchronizer 210 disengage the transmission when brakes are applied. For example, the driver may be traveling on mountainous terrain and wish to keep the transmission engaged to benefit from the deceleration effects of an engaged transmission.

When the predicted driver action will result in an acceleration of vehicle 200, powertrain synchronizer 210 analyzes driveshaft rotation data 265 that indicates the rotation speed of driveshaft 250. Driveshaft 250's rotation speed corresponds to wheel rotation 255 and, in one embodiment, powertrain synchronizer 210 may determine driveshaft 250's rotation speed using speedometer readings from vehicle 200. Based upon driveshaft 250's rotation speed, powertrain synchronizer 210 configures gear assembly 245 via gear selection 270. For example, assuming driveshaft 250's rotation speed corresponds to vehicle 200 traveling at 40 mph, powertrain synchronizer 210 may configure gear assembly 245 to be in fourth gear.

Once gear assembly 245 is in the configured gear, powertrain synchronizer 210 determines the rotation speed of gear assembly input shaft 240 and engine crankshaft 225 via gear assembly/engine crankshaft rotation data 275. For example, gear assembly input shaft 240 may be rotating at 100 RPM and engine crankshaft 225 may be rotating at 110 RPM. Powertrain synchronizer 210 adjusts engine 220's fuel via fuel adjustment 280 accordingly to match engine crankshaft 225's rotation speed to gear assembly input shaft 240's rotation speed, thus synchronizing powertrain 215. Fuel adjustment 280 may adjust the gas, diesel, electric, or other agent that fuels engine 220.

Once powertrain 215 is synchronized, powertrain synchronizer 210, in one embodiment, informs the driver to perform the predicted driver action via driver indicators on instrumentation panel 285. When the driver performs the driver action, such as depressing the accelerator pedal, powertrain synchronizer 210 engages clutch 235, which transfers power from engine 220 to wheel 255 through transmission 270.

Figure 3:
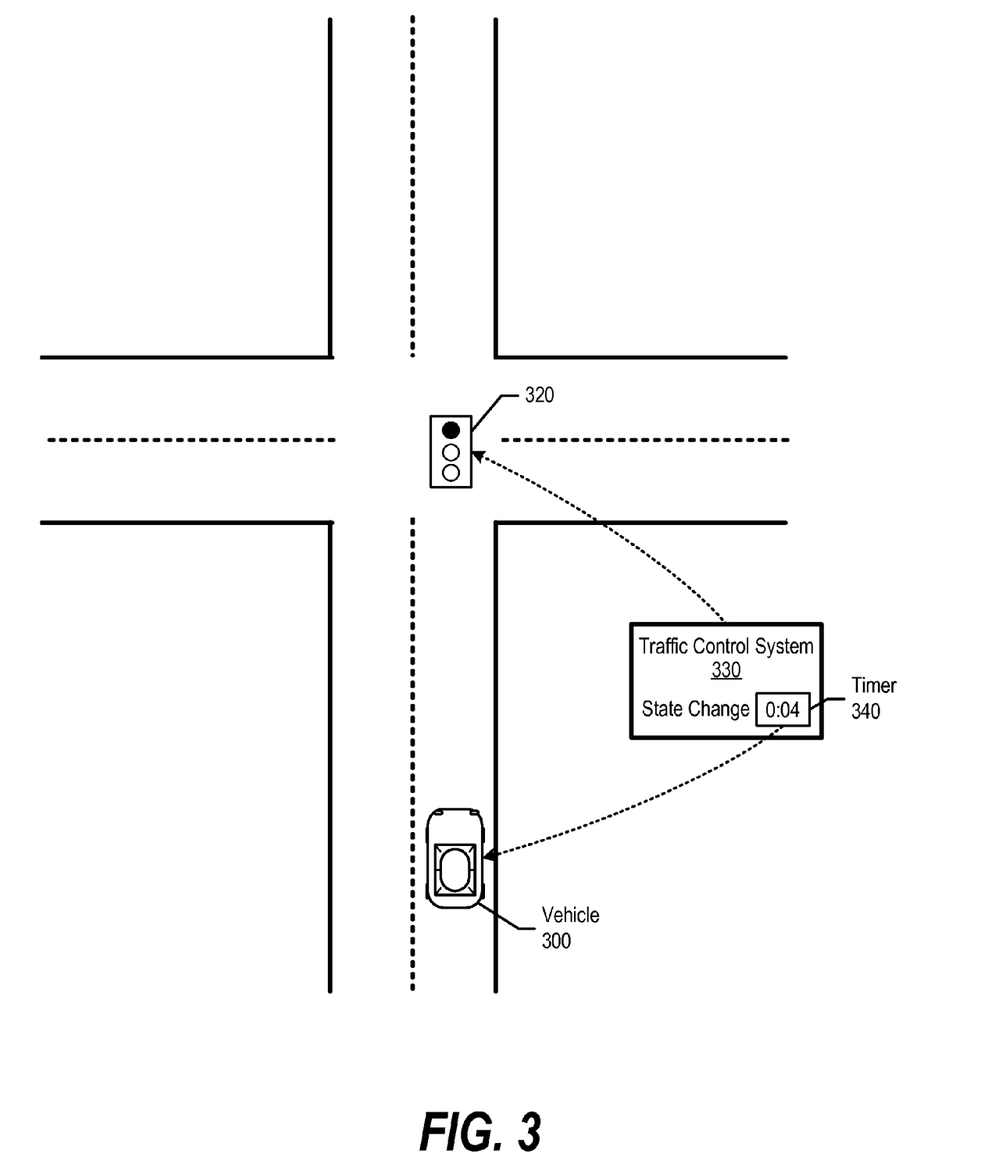
FIG. 3 depicts a diagram showing a vehicle approaching a traffic light that is soon to change state.

FIG. 3 depicts a diagram showing a vehicle approaching a traffic light that is soon to change state. Vehicle 300 is approaching an intersection that includes traffic light 320. Traffic light 320 is controlled by traffic control system 330, which has traffic light 320's state set to RED. FIG. 3 shows, however, that traffic light 320's state is about to change in four seconds (timer 340). Traffic control system 330 sends the traffic light timer data to vehicle 300 (condition data), which vehicle 300's powertrain synchronizer analyzes to determine whether a driver action is eminent (predicted driver action).

Assuming that vehicle 300 is currently coasting or braking, the powertrain synchronizer identifies that the traffic light state change is about to change. As such, the powertrain synchronizer configures gear assembly 245 according to the current speed of vehicle 300 and adjusts the engine's fuel rate accordingly to synchronize vehicle 300's powertrain by matching engine crankshaft 225's rotation speed to gear assembly input shaft 240's rotation speed. In turn, in one embodiment, the powertrain synchronizer informs the driver to depress the accelerator pedal. In this embodiment, the powertrain synchronizer engages clutch 235 to provide propulsion to wheel 255 once the driver depresses the accelerator pedal.

Figure 4:
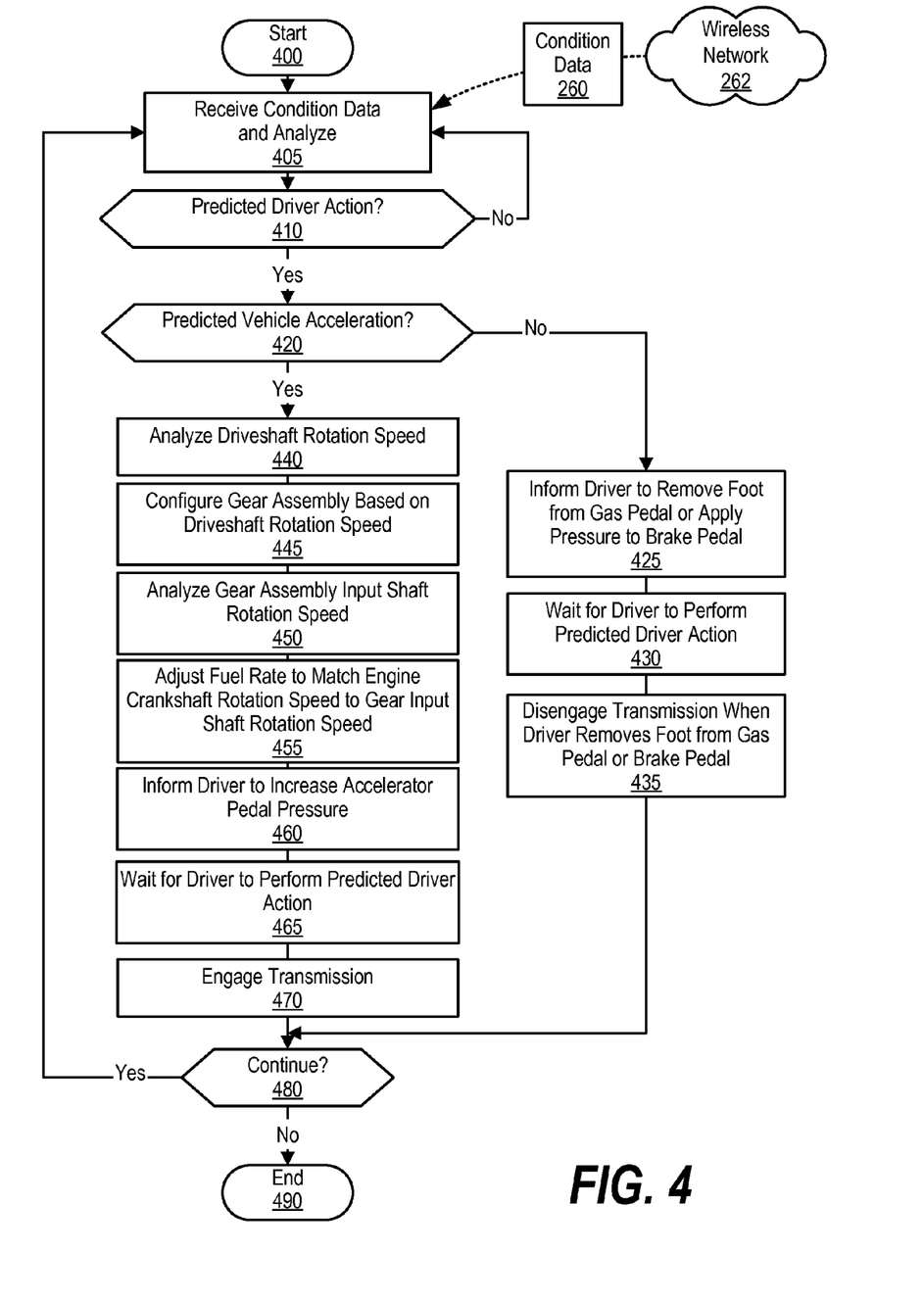
FIG. 4 depicts a flowchart showing steps taken in synchronizing a vehicle powertrain.

FIG. 4 depicts a flowchart showing steps taken in synchronizing a vehicle powertrain. Powertrain synchronizer processing commences at 400, whereupon the powertrain synchronizer receives condition data 260 over wireless network 262 (step 405). In one embodiment, the condition data corresponds to impending conditions such as an upcoming speed limit change, an upcoming stop sign marker, road terrain changes such as curves or hills, etc. In another embodiment, the condition data corresponds to predicted impending conditions, which are influences that are not yet apparent to the driver such as a predicted traffic light state change or a predicted emergency vehicle arrival.

A determination is made as to whether the condition data corresponds to a predicted driver action that will cause the driver to adjust driver controls to accelerate or decelerate the vehicle (decision 410). If the condition data does not result in a predicted driver action, decision 410 branches to the "No" branch, which loops back to monitor condition data 260. This looping continues until condition data 260 results in a determined predicted driver action, at which point decision 410 branches to the "Yes" branch.

A determination is made as to whether the predicted driver action corresponds to a predicted vehicle acceleration (decision 420). For example, the predicted driver action may be increasing the pressure to an accelerator pedal (vehicle acceleration), or the predicted driver action may be decreasing pressure to the accelerator pedal or applying pressure to a brake pedal (vehicle deceleration). If the predicted driver action corresponds to a predicted vehicle deceleration, decision 420 proceeds to the "No" branch, whereupon the powertrain synchronizer informs the driver to remove their foot from the accelerator pedal or to apply the brake pedal according to the rate at which the vehicle speed should be reduced based upon the impending condition (step 425). For example, if the vehicle is traveling at a high rate of speed and the impending condition is an accident around a curve, the powertrain synchronizer informs the driver to apply pressure to the brake pedal to slow down the vehicle quickly.

At step 430, the powertrain synchronizer waits for the driver to perform the predicted driver action. Once the driver performs the predicted action, the powertrain synchronizer disengages the transmission from the engine by disengaging clutch 235 shown in FIG. 2 (step 435). In one embodiment, the powertrain synchronizer waits for a pre-determined time for the driver to perform the predicted driver action. In this embodiment, if the driver does not perform the predicted driver action, the powertrain system either resets and continues to monitor condition data or alerts the driver through other means, such as by blinking one of powertrain synchronization indicators 530 shown in FIG. 5.

Referring back to decision 420, if the predicted driver action corresponds to a predicted vehicle acceleration, decision 420 branches to the "Yes" branch. At 440, the powertrain synchronizer analyzes the vehicle's driveshaft rotation, which corresponds to the wheel rotation speed of the vehicle (driveshaft rotation 250 shown in FIG. 2). The powertrain synchronizer configures gear assembly 245 based upon the driveshaft rotation speed at step 445. For example, if the driveshaft rotation speed is rotating at a rate that propels vehicle 200 to 20 mph, powertrain synchronizer 210 may place gear assembly 240 in second gear.

Next, the powertrain synchronizer analyzes the gear assembly input shaft rotation, which is a result of the driveshaft rotation speed and the configured gear selection of gear assembly 245 (gear assembly input shaft rotation 240 shown in FIG. 2). As can be seen in FIG. 2, gear assembly input shaft rotation 240 is on one side of clutch 235. In order to synchronize powertrain 215 and produce a smooth transmission engagement, engine crankshaft rotation 225 should rotate at a speed similar to the rotation speed of gear assembly input shaft rotation 240. As such, the powertrain synchronizer adjusts the fuel rate to engine 220 (step 455) to increase or decrease engine crankshaft rotation 225 to match gear assembly input shaft rotation 240.

Figure 5:
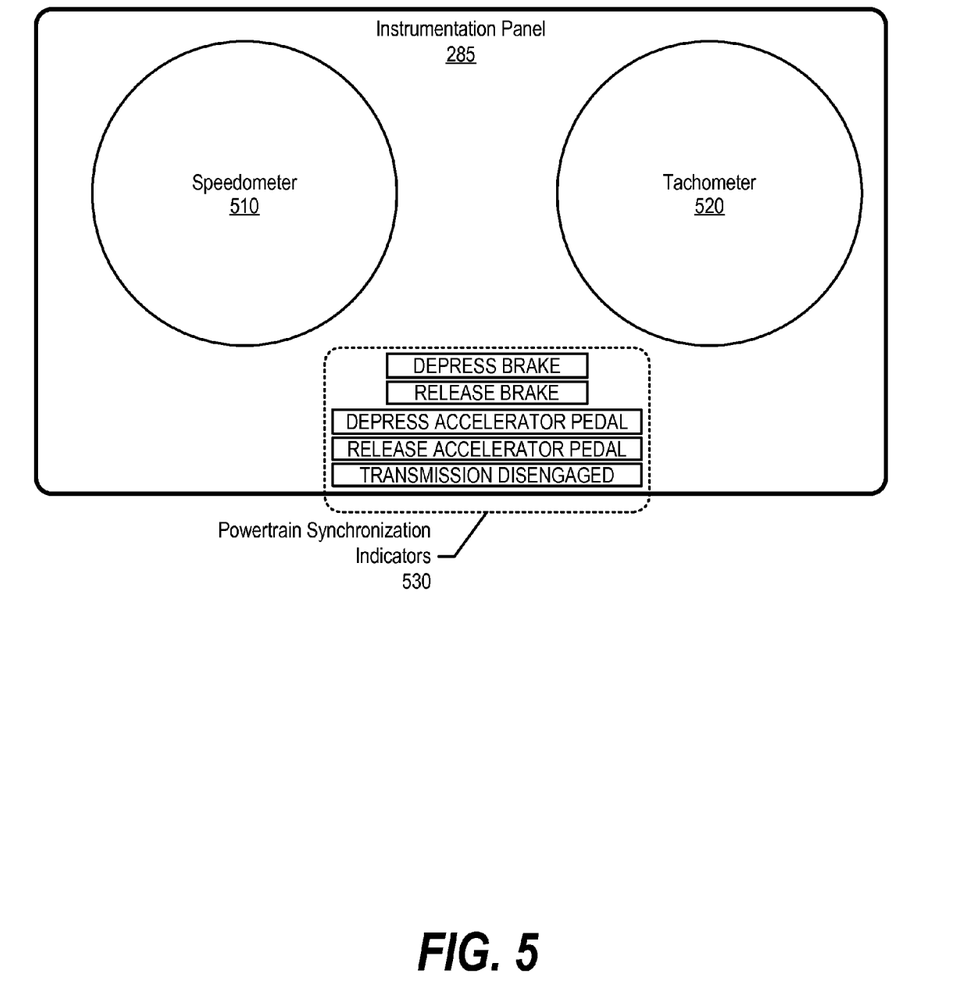
FIG. 5 depicts a diagram of a vehicle instrument panel that includes powertrain synchronization indicators.

At step 460, the powertrain synchronizer informs the driver to increase the accelerator pedal pressure since the powertrain is synchronized, such as by illuminating one of powertrain synchronization indicators 530 shown in FIG. 5. The powertrain synchronizer waits for the driver to perform the predicted driver action at step 465 and engages the transmission by engaging clutch 235 (step 470).

A determination is made on whether to continue to monitor condition data 260 and synchronize the vehicle powertrain accordingly (decision 480). If the powertrain synchronizer should continue powertrain synchronization, decision 480 branches to the "Yes" branch, which loops back to continue processing condition data. This looping continues until the powertrain synchronizer should terminate powertrain synchronization (e.g., vehicle turned off), at which point decision 480 branches to the "No" branch, whereupon processing ends at 490.

FIG. 5 depicts a diagram of a vehicle instrument panel that includes powertrain synchronization indicators. Instrumentation panel 285 includes speedometer 510, tachometer 520, and powertrain synchronization indicators 530. As those skilled in the art can appreciate, instrumentation panel 285 may include more or less indicators than what is shown in FIG. 5.

Powertrain synchronizer 210 illuminates specific powertrain synchronization indicators 530 based upon current vehicle conditions and predicted driver actions. For example, when the vehicle is coasting and powertrain synchronizer 210 determines that a traffic signal is about to change to green, powertrain synchronizer 210 illuminates "depress accelerator pedal" once the powertrain is synchronized. In another embodiment, when the speed limit on a road is about to decrease, powertrain synchronizer 210 illuminates "release accelerator pedal." In yet another embodiment, powertrain synchronizer 210 illuminates "transmission disengaged" when powertrain synchronizer 210 disengages the transmission (see FIG. 4 and corresponding text for further details).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method for synchronizing a powertrain subsystem in a vehicle, the method comprising:
    analyzing, by one or more processors included in the vehicle, condition data that corresponds to one or more impending conditions external to the vehicle;
    predicting a driver action corresponding to a driver of the vehicle in response to the analysis, wherein the predicted driver action corresponds to a predicted deceleration of the vehicle;
    providing an indication to the driver to decelerate the vehicle, wherein the indication is selected from the group consisting of decreasing accelerator pedal pressure and increasing brake pedal pressure; and
    disengaging a transmission included in the powertrain subsystem in response to the driver performing the predicted driver action.

2. The method of claim 1 wherein the predicted driver action corresponds to a predicted acceleration of the vehicle, the method further comprising:
    analyzing a driveshaft rotation of the powertrain subsystem, wherein the driveshaft rotation corresponds to a speed at which the vehicle is traveling;
    configuring a gear assembly included in the transmission based upon the driveshaft rotation;
    analyzing a rotation speed of a gear assembly input shaft in response to the configuration; and
    adjusting a fuel rate to an engine included in the powertrain to match an engine crankshaft rotation speed to the gear assembly input shaft rotation speed.

3. The method of claim 2 further comprising:
    determining that the powertrain subsystem is synchronized in response to the adjustment of the fuel rate;
    informing the driver to increase the accelerator pedal pressure in response to the determination; and
    engaging the transmission in response to the driver increasing the accelerator pedal pressure.

4. The method of claim 1 wherein the condition data is received by the vehicle over a wireless network, and wherein at least one of the one or more impending conditions is selected from the group consisting of an upcoming road terrain change, an upcoming speed limit change, and an upcoming stop sign marker.

5. The method of claim 4 wherein the impending condition is unviewable by a driver of the vehicle at the time of the determination of the predicted driver action.

6. The method of claim 1 wherein at least one of the one or more impending conditions includes a predicted impending condition selected from the group consisting of a predicted traffic light status change and a predicted emergency vehicle arrival.

7. An information handling system comprising:
    one or more processors;
    a memory coupled to at least one of the processors;
    a set of instructions stored in the memory and executed by at least one of the processors in order to perform actions of:
        analyzing, by one or more processors included in a vehicle, condition data that corresponds to one or more impending conditions external to the vehicle;
        predicting a driver action corresponding to a driver of the vehicle in response to the analysis, wherein the predicted driver action corresponds to a predicted deceleration of the vehicle;
        providing an indication to the driver to decelerate the vehicle, wherein the indication is selected from the group consisting of decreasing accelerator pedal pressure and increasing brake pedal pressure; and
        disengaging a transmission included in the powertrain subsystem in response to the driver performing the predicted driver action.

8. The information handling system of claim 7 wherein the predicted driver action corresponds to a predicted acceleration of the vehicle, and wherein at least one of the one or more processors perform additional actions comprising:
    analyzing a driveshaft rotation of the powertrain subsystem, wherein the driveshaft rotation corresponds to a speed at which the vehicle is traveling;
    configuring a gear assembly included in the transmission based upon the driveshaft rotation;
    analyzing a rotation speed of a gear assembly input shaft in response to the configuration; and
    adjusting a fuel rate to an engine included in the powertrain to match an engine crankshaft rotation speed to the gear assembly input shaft rotation speed.

9. The information handling system of claim 8 wherein at least one of the one or more processors perform additional actions comprising:
    determining that the powertrain subsystem is synchronized in response to the adjustment of the fuel rate;
    informing the driver to increase the accelerator pedal pressure in response to the determination; and
    engaging the transmission in response to the driver increasing the accelerator pedal pressure.

10. The information handling system of claim 7 wherein the condition data is received by the vehicle over a wireless network, and wherein at least one of the one or more impending conditions is selected from the group consisting of an upcoming road terrain change, an upcoming speed limit change, and an upcoming stop sign marker.

11. The information handling system of claim 10 wherein the impending condition is unviewable by a driver of the vehicle at the time of the determination of the predicted driver action.

12. The information handling system of claim 7 wherein at least one of the one or more impending conditions includes a predicted impending condition selected from the group consisting of a predicted traffic light status change and a predicted emergency vehicle arrival.

13. A computer program product stored in a computer readable storage medium, comprising computer program code that, when executed by an information handling system, causes the information handling system to perform actions comprising:
    analyzing, by one or more processors included in a vehicle, condition data that corresponds to one or more impending conditions external to the vehicle;
    predicting a driver action corresponding to a driver of the vehicle in response to the analysis, wherein the predicted driver action corresponds to a predicted deceleration of the vehicle;
    providing an indication to the driver to decelerate the vehicle, wherein the indication is selected from the group consisting of decreasing accelerator pedal pressure and increasing brake pedal pressure; and disengaging a transmission included in the powertrain subsystem in response to the driver performing the predicted driver action.

14. The computer program product of claim 13 wherein the predicted driver action corresponds to a predicted acceleration of the vehicle, and wherein the computer program code, when executed by an information handling system, causes the information handling system to perform further actions comprising:
- analyzing a driveshaft rotation of the powertrain subsystem, wherein the driveshaft rotation corresponds to a speed at which the vehicle is traveling;
- configuring a gear assembly included in the transmission based upon the driveshaft rotation;
- analyzing a rotation speed of a gear assembly input shaft in response to the configuration; and
- adjusting a fuel rate to an engine included in the powertrain to match an engine crankshaft rotation speed to the gear assembly input shaft rotation speed.

15. The computer program product of claim 14 wherein the computer program code, when executed by an information handling system, causes the information handling system to perform further actions comprising:
- determining that the powertrain subsystem is synchronized in response to the adjustment of the fuel rate;
- informing the driver to increase the accelerator pedal pressure in response to the determination; and
- engaging the transmission in response to the driver increasing the accelerator pedal pressure.

16. The computer program product of claim 13 wherein:
the condition data is received by the vehicle over a wireless network, and wherein at least one of the one or more impending conditions is selected from the group consisting of an upcoming road terrain change, an upcoming speed limit change, and an upcoming stop sign marker; and the impending condition is unviewable by a driver of the vehicle at the time of the determination of the predicted driver action.

17. The computer program product of claim 13 wherein at least one of the one or more impending conditions includes a predicted impending condition selected from the group consisting of a predicted traffic light status change and a predicted emergency vehicle arrival.

* * * * *